United States Patent
Hu et al.

(10) Patent No.: US 12,000,767 B2
(45) Date of Patent: Jun. 4, 2024

(54) NATURAL GAS DIFFUSION COEFFICIENT MEASUREMENT AUXILIARY DEVICE OF HAND-OPERATED LIFTING DEVICE

(71) Applicant: Southwest Petroleum University, Sichuan (CN)

(72) Inventors: Shuyong Hu, Sichuan (CN); Tingting Qiu, Sichuan (CN); Liehui Zhang, Sichuan (CN); Yulong Zhao, Sichuan (CN); Huiying Tang, Sichuan (CN); Xindong Wang, Sichuan (CN); Nana Song, Sichuan (CN); Xueqiang Guo, Sichuan (CN)

(73) Assignee: Southwest Petroleum University, Sichuan (CN)

( * ) Notice: Subject to any disclaimer, the term of this patent is extended or adjusted under 35 U.S.C. 154(b) by 775 days.

(21) Appl. No.: 17/057,684

(22) PCT Filed: May 18, 2020

(86) PCT No.: PCT/CN2020/090792
§ 371 (c)(1),
(2) Date: Dec. 1, 2020

(87) PCT Pub. No.: WO2021/139065
PCT Pub. Date: Jul. 15, 2021

(65) Prior Publication Data
US 2022/0136948 A1   May 5, 2022

(30) Foreign Application Priority Data
Jan. 10, 2020   (CN) .......................... 202010028377.3

(51) Int. Cl.
*G01N 13/00*   (2006.01)
*E21B 25/00*   (2006.01)

(52) U.S. Cl.
CPC ........... *G01N 13/00* (2013.01); *E21B 25/005* (2013.01); *G01N 2013/003* (2013.01)

(58) Field of Classification Search
None
See application file for complete search history.

(56) References Cited

U.S. PATENT DOCUMENTS 5,079,948 A * 1/1992 Collins ................. G01N 13/00
73/152.24
5,297,420 A * 3/1994 Gilliland .............. G01N 33/241
73/38

(Continued)

FOREIGN PATENT DOCUMENTS

CN   202195998 U   4/2012
CN   203321470 U   12/2013

(Continued)

*Primary Examiner* — Kristina M Deherrera
*Assistant Examiner* — Mark A Shabman

(57) ABSTRACT

The invention discloses a natural gas diffusion coefficient measurement auxiliary device based on a hand-operated lifting device, comprising a core chamber, a bracket, a core preservation device, and a hand-operated lifting device; the left side of the core chamber is connected with a methane measuring chamber, and the right side of the core chamber is connected with a nitrogen measuring chamber; a rotatable bracket is installed on the lower left side of the core chamber, and the lower right side of the core chamber is connected with the hand-operated lifting device; the core chamber is rotated by the hand-operated lifting device with the support as the center; a horizontal platform at the lower part of the core chamber is provided with a revolving door that can accommodate the left end of the core chamber; a core preservation device is installed at the lower part of the revolving door. The invention has a simple structure, which greatly reduces the time required to load the core during natural gas diffusion coefficient measurement, and can effec- (Continued)

tively prevent the core from breaking and the rubber sleeve from being damaged.

3 Claims, 2 Drawing Sheets

(56) References Cited

U.S. PATENT DOCUMENTS

| | | | | |
|---|---|---|---|---|
| 8,522,599 | B2* | 9/2013 | Coleman | G01N 33/241 73/19.01 |
| 9,341,558 | B1* | 5/2016 | Khan | G01N 33/383 |
| 10,401,274 | B2* | 9/2019 | Liu | G01N 15/0826 |
| 10,466,153 | B2* | 11/2019 | Gupta | G01N 15/0826 |
| 2017/1542992 | | 8/2017 | Crowell | |

FOREIGN PATENT DOCUMENTS

| | | |
|---|---|---|
| CN | 204177799 U | 2/2015 |
| CN | 104865164 A | 8/2015 |
| CN | 106353223 A | 1/2017 |
| CN | 110658351 A | 1/2020 |
| CN | 111157405 A | 5/2020 |

\* cited by examiner

NATURAL GAS DIFFUSION COEFFICIENT MEASUREMENT AUXILIARY DEVICE OF HAND-OPERATED LIFTING DEVICE

BACKGROUND OF THE INVENTION

1. Field of the Invention

The invention belongs to the technical field of measurement experimental devices, in particular to a natural gas diffusion coefficient measurement auxiliary device based on a hand-operated lifting device.

2. Background of the Related Art

Studying the natural gas diffusion coefficient is of great significance to gas reservoir engineering. In the theoretical study of seepage flow in gas reservoir engineering, the diffusion coefficient of natural gas is also an important parameter. The diffusion coefficient of natural gas is usually measured in accordance with industry standard experiments. Since there are many factors to be considered during the experiment, there are usually many defects. Considering that the core holder in the traditional shale gas diffusion coefficient measurement device is in use, in order to avoid the influence of gravity on the experimental results, it is usually directly fixed on the horizontal platform, and the following defects exist when the core is taken out and loaded.

1. For the traditional experimental device, the core can only be manually pushed into the chamber during the core loading process. Due to the limited space in the chamber, the core needs to be manually pushed to a proper position with other tools, which can easily cause the rock to get stuck in the chamber, and may even break the more brittle rocks and damage the rubber sleeve in the chamber.

2. For the traditional experimental device, the core can only be taken out through external objects during the core extraction process. The chamber is very narrow and the core is easy to get stuck; what is more serious is that the rubber cylinder is damaged and the core is broken.

Therefore, it is of great significance to improve the current natural gas coefficient measuring device.

SUMMARY OF THE INVENTION

The purpose of the invention is to provide a natural gas diffusion coefficient measurement auxiliary device based on a hand-operated lifting device, which aims to solve the problems above.

The invention is achieved by the following technical solutions:

a natural gas diffusion coefficient measurement auxiliary device based on a hand-operated lifting device, comprising a core chamber, a bracket, a core preservation device, and a hand-operated lifting device;

the left side of the core chamber is connected with a methane measuring chamber, and the right side of the core chamber is connected with a nitrogen measuring chamber; a rotatable bracket is installed on the lower left side of the core chamber, and the lower right side of the core chamber is connected with the hand-operated lifting device; the core chamber is rotated by the hand-operated lifting device with the support as the center; a horizontal platform at the lower part of the core chamber is provided with a revolving door that can accommodate the left end of the core chamber; a core preservation device is installed at the lower part of the revolving door.

Further, it further comprises a box body; the box body is arranged directly below the core chamber; the bracket is installed on the box body; the upper side of the box body is a horizontal platform; the left side of the box body is provided with a hollow accommodation area for accommodating the core chamber when the left end of the core chamber rotates downwards; a revolving door is provided above the hollow accommodation area; the core preservation device is installed in the hollow accommodation area and located under the revolving door; the core preservation device is capable of storing the core out of the core chamber when the left end of the core chamber rotates downward.

Further, the hand-operated lifting device is controlled by a shaking handle; the hand-operated lifting device converts the up and down reciprocating motion of the lifting mechanism of the hand-operated lifting device into the rotation of the core chamber by shaking the shaking handle back and forth; the core chamber loads or takes out the core under the action of gravity when rotating.

The advantageous effects of the invention are:

1. By providing the core chamber, the bracket, the core preservation device and the hand-operated lifting device, the design of the invention enables the loading process to be easier during the core loading process. After opening the relevant valve, it is only need to place the core on one end of the core chamber, slowly shake the lifting device, so that the entire chamber slowly rotates around the fulcrum at the other end, until it rotates to an angle where the core holder is perpendicular to the horizontal platform, which makes the loading process easier.

2. By providing the core chamber, the bracket, the core preservation device and the hand-operated lifting device, the core does not need to be artificially pushed in during the core loading process in the invention; it is only need to put the core into the mouth of the chamber and slowly shake the lifting device to make the core reach the appropriate position, which avoids the core from getting stuck in the chamber, even causing the rubber cylinder damaged and the core broken.

3. By providing the core chamber, the bracket, the core preservation device and the hand-operated lifting device, the device of the invention does not require artificial external force to take out the core during the core taking out process; it is only need to slowly shake the lifting device until it rotates to an angle where the core holder is perpendicular to the horizontal platform, so that the core can be slowly taken out of the chamber by gravity, which greatly reduces the risk of damaging the rubber cylinder and core, and enables the operation process to be easier and simpler.

Figure 1:
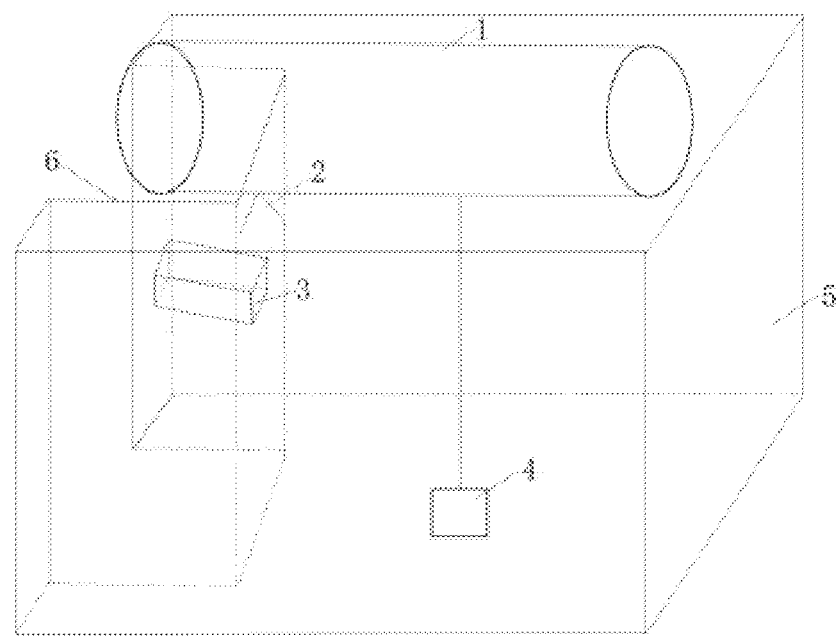
FIG. 1 is a schematic structural diagram of the natural gas diffusion coefficient measurement auxiliary device based on a hand-operated lifting device according to the embodiment of the invention.

In the figures, 1 refers to the core chamber; 2 refers to the bracket; 3 refers to the core preservation device; 4 refers to the hand-operated lifting device; 5 refers to the box body; 6 refers to the hollow accommodation area; 7 refers to the shaking handle; 8 refers to the lifting mechanism.

DETAILED DESCRIPTION OF THE PREFERRED EMBODIMENTS

The invention will be further described hereinafter with reference to the drawings.

Embodiment 1

As shown in FIG. 1-FIG. 4, the embodiment of the invention provides a natural gas diffusion coefficient measurement auxiliary device based on a hand-operated lifting device, comprising a core chamber 1, a bracket 2, a core preservation device 3, and a hand-operated lifting device 4;

the left side of the core chamber 1 is connected with a methane measuring chamber, and the right side of the core chamber 1 is connected with a nitrogen measuring chamber; a rotatable bracket 2 is installed on the lower left side of the core chamber 1, and the lower right side of the core chamber 1 is connected with the hand-operated lifting device 4; the core chamber 1 is rotated by the hand-operated lifting device 4 with the support 2 as the center; a horizontal platform at the lower part of the core chamber 1 is provided with a revolving door that can accommodate the left end of the core chamber 1; a core preservation device 3 is installed at the lower part of the revolving door.

In the embodiment of the invention, as shown in FIG. 1, the device further comprises a box body 5; the box body 5 is arranged directly below the core chamber 1; the bracket 2 is installed on the box body 5; the upper side of the box body 5 is a horizontal platform; the left side of the box body 5 is provided with a hollow accommodation area 6 for accommodating the core chamber 1 when the left end of the core chamber 1 rotates downwards; a revolving door is provided above the hollow accommodation area 6; the core preservation device 3 is installed in the hollow accommodation area 6 and located under the revolving door; the core preservation device 3 is capable of storing the core out of the core chamber 1 when the left end of the core chamber 1 rotates downward.

In the embodiment, the hand-operated lifting device 4 is controlled by a shaking handle; the hand-operated lifting device 4 converts the up and down reciprocating motion of the lifting mechanism of the hand-operated lifting device 4 into the rotation of the core chamber 1 by shaking the shaking handle back and forth; the core chamber 1 loads or takes out the core under the action of gravity when rotating.

The traditional device is equipped with a rubber cylinder in the core holder, and the experimental core is stuffed into the rubber cylinder from one end of the holder under the push of external force. This process is very complicated: every time the core is loaded, it is need to open the chamber and unscrew the relevant valve; under the push of external force, it is inserted into the rubber cylinder from the end of the holder; the whole loading process is based on experience to load the core to the appropriate core position, which is easy to make mistakes. At the same time, when loading the core, it is need to push the core into the chamber through the plug of the core; due to the narrow chamber, the core is likely to crash into the rubber cylinder under the push of external force without being flattened, causing the core to get stuck in the chamber, and even damage the rubber cylinder and the core to break. When taking out the core, the traditional experimental device can only take out the core through external objects during the core taking out process; the chamber is very narrow and the core is easy to get stuck; what is more serious is that the rubber cylinder is damaged and the core is broken.

In addition, when loading and taking out the core, the two ends of the rubber cylinder of the traditional device are in a through state, one end requires foreign objects, and the other end is for the in and out of the core.

The design of the invention enables the loading process to be easier during the loading process; it is only need to open the right side of the core chamber after opening the relevant valve, put the core at the right entrance of the chamber, and the left side of the core chamber is closed. Slowly shake the hand-operated lifting device to make the core slide slowly to a proper position under the action of gravity until the chamber is perpendicular to the horizontal platform, and load the core plug. Slowly shake the hand-operated lifting device until the chamber is parallel to the horizontal platform. This improvement enables the replacement process to be easier and does not need to manually push the core in; it is only need to put the core into the mouth of the chamber and slowly shake the lifting device to make the core reach the appropriate position.

The device of the invention does not require artificial external force to take out the core during the core taking out process; it is only need to open the left side of the chamber and slowly shake the hand-operated lifting device until the chamber is perpendicular to the horizontal platform, so that the core slides along the chamber under the action of gravity into the core preservation device. Slowly shake the hand-operated lifting device until the chamber is parallel to the horizontal platform. The core can be slowly taken out of the chamber by gravity, which greatly reduces the risk of damaging the rubber cylinder and core, and enables the operation process to be easier and simpler.

In loading, the left core chamber is plugged, and the core is placed on the right end; it is opposite when taking out, the right end is closed, and the left end is open.

At the same time, the device of the invention is equipped with a core preservation device below the revolving door, which can not only be used as a temporary preservation of the core, but also enables the core to automatically slide into the core preservation device during the core taking out process, which greatly reduces human error and avoids core impact.

Embodiment 2

Figure 2:
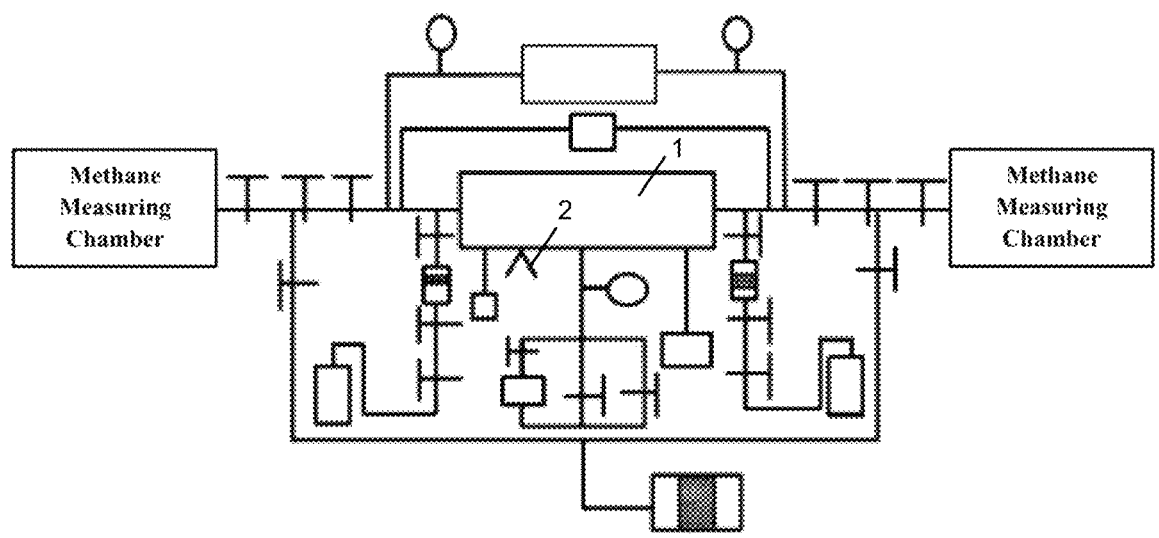
FIG. 2 is a schematic diagram of the invention when in use.
Figure 3:
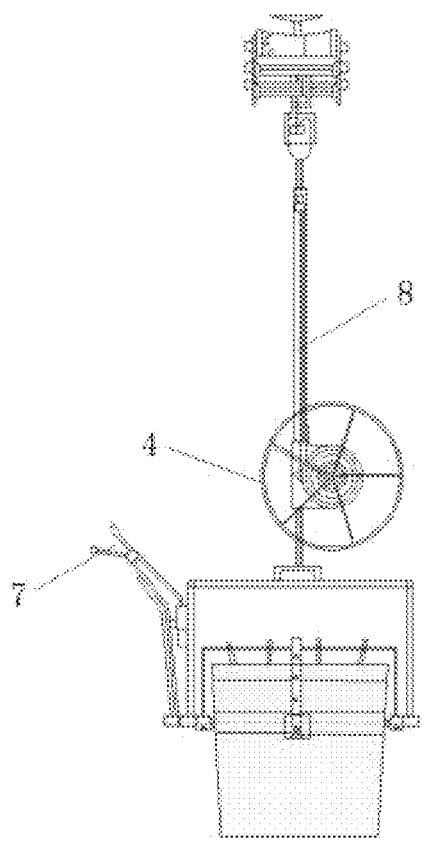
FIG. 3 is an overall schematic diagram of the hand-operated lifting device according to the embodiment of the invention.
Figure 4:
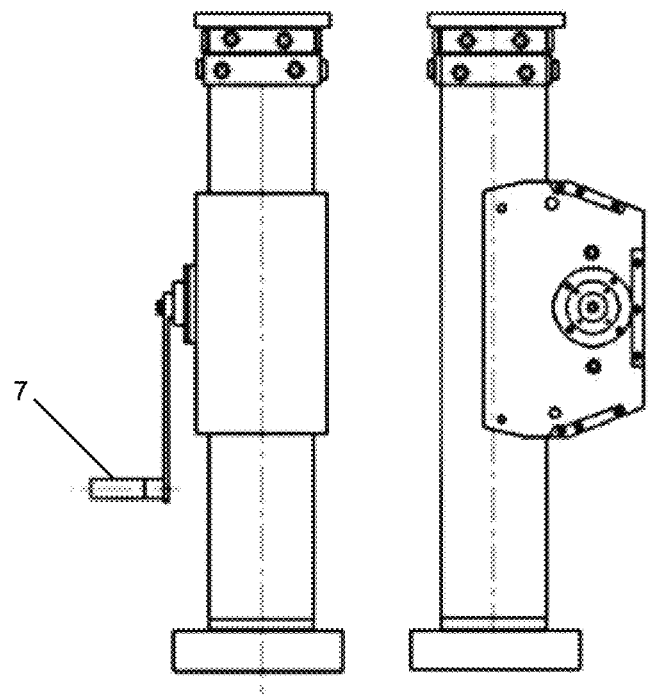
FIG. 4 is a cross-sectional view of the hand-operated lifting device according to the embodiment of the invention.

When the natural gas diffusion coefficient measurement auxiliary device based on a hand-operated lifting device in the embodiment of the invention is used to measure the diffusion coefficient of natural gas, the core holder part of the traditional natural gas diffusion coefficient measurement device is replaced, and the device is connected to the measuring device in the manner shown in FIG. 2, as shown in FIG. 2. In measuring, the entire measuring device involves the core chamber, the left methane measuring chamber, the left overflow valve, the left vacuum valve, the left overflow valve, the left measuring valve, the left sampling valve, the left inlet valve, the left gas booster valve, the left gas source valve, the left middle container, the methane cylinder, the left hydrocarbon input pressure gauge, the left vacuum valve, the vacuum pump, the right vacuum valve, the right nitrogen measuring chamber, the right overflow valve, the right measuring valve, the right sampling valve, the right inlet valve, the right gas booster valve, the right middle container, the right hydrocarbon inlet pressure measuring gauge, the formation thermostat, the formation pressure gauge, the safety valve, the pressure relief valve, the booster valve, the confining pressure pump, the bracket, the hand-operated lifting device, the revolving door, and the core preservation device.

The left methane measuring chamber is connected to the left overflow valve and the left vacuum valve in sequence, and the left overflow valve is connected to the left measuring valve and the left sampling valve in sequence; the left side of the core chamber is connected to the left inlet valve, and the left inlet valve is connected to the left gas booster valve, the left air source valve, the left middle container and the methane cylinder in sequence; the left chamber is connected to the left hydrocarbon input pressure gauge; the left vacuum valve is connected to the vacuum pump and the right vacuum valve; the right nitrogen measuring chamber is connected to the right overflow valve, the right measuring valve, and the right sampling valve in sequence; the right side of the core chamber is connected to the right inlet valve, the right gas booster valve, and the right middle container in sequence; the right chamber is connected to the right hydrocarbon inlet pressure gauge; the chamber is connected in parallel to the formation thermostat; the middle of the core chamber is connected to the formation pressure gauge, and the formation pressure gauge is connected to the parallel safety valve, the pressure relief valve, and the boost valve, and connected to the confining pressure pump.

The experimental procedures for natural gas diffusion coefficient measurement with the invention are as follows:

(1) Experimental preparation. Check whether all valves are closed, and keep all valves closed. Connect the methane cylinder and the nitrogen cylinder to the instrument.

(2) Core Loading. Open the right side of the core chamber, place the core at the right entrance of the chamber, and the left side of the core chamber is closed. Slowly shake the hand-operated lifting device to make the core slide slowly to a proper position under the action of gravity until the chamber is perpendicular to the horizontal platform, and load the core plug. Slowly shake the hand-operated lifting device until the chamber is parallel to the horizontal platform.

(3) Turn on the power and connect external devices.

(4) Turn on the heating switch and set the temperature to the specified value.

(5) Open the confining pressure boost valve. Use a pressure rod to pressurize the holder to the experimental pressure, and close the confining pressure booster valve after the pressure stabilizes.

(6) Open the methane and nitrogen gas source valves, open the inlet valve, and after the pressure difference remains stable, turn off the gas cylinder switch and close the gas source valve.

Sampling.

(8) Open the vacuum valve and the overflow valve, turn on the power of the vacuum pump, and close the overflow valve after one minute. Open the left and right sampling valves to fill the standard volume chamber with gas, and then close the left and right sampling valves. Open the measuring valve and read the methane concentration and the nitrogen concentration on the left and right sides. Close the measuring valve.

(9) Turn off the formation heating and discharge the gas to a specific container. After the temperature of the chamber cools to normal temperature, open the plug on the left side of the core chamber; slowly shake the hand-operated lifting device until the chamber is perpendicular to the horizontal platform, so that the core slides along the chamber under the action of gravity into the core preservation device. Slowly shake the hand-operated lifting device until the chamber is parallel to the horizontal platform. Restore the instrument. If it is need to measure again, repeat the above steps; if it is not need to measure, close each valve of the instrument and turn off the power.

The specific embodiments of the invention are described hereinabove to facilitate those skilled in the art to understand the invention. But it should be clear that the invention is not limited to the scope of the specific embodiments. For those of ordinary skill in the art, various changes are obvious as long as they fall within the spirit and scope of the invention defined and determined by the appended claims. All inventions and creations within the concept of the invention are protected.

The invention claimed is:

1. A natural gas diffusion coefficient measurement auxiliary device of a hand-operated lifting device, comprising:
    a core chamber (1), a bracket (2), a core preservation device (3), and a hand-operated lifting device (4);
    the left side of the core chamber (1) is connected with a methane measuring chamber, and the right side of the core chamber (1) is connected with a nitrogen measuring chamber;
    a rotatable bracket (2) installed on the lower left side of the core chamber (1), and the lower right side of the core chamber (1) is connected with the hand-operated lifting device (4);
    the core chamber (1) is rotatable by the hand-operated lifting device (4) with the bracket (2) as the center;
    a horizontal platform at the lower part of the core chamber (1) is provided with a revolving door that can accommodate the left end of the core chamber (1); and
    a core preservation device (3) is installed at the lower part of the revolving door.

2. A natural gas diffusion coefficient measurement auxiliary device of a hand-operated lifting device according to claim 1, wherein it further comprises:
    a box body (5);
    the box body (5) is arranged directly below the core chamber (1);
    the bracket (2) is installed on the box body (5);
    the upper side of the box body (5) is a horizontal platform;
    the left side of the box body (5) is provided with a hollow accommodation area (6) for accommodating the core chamber (1) when the left end of the core chamber (1) rotates downwards;
    the revolving door is provided above the hollow accommodation area (6);
    the core preservation device (3) is installed in the hollow accommodation area (6) and located under the revolving door; and
    the core preservation device (3) is capable of storing the core out of the core chamber (1) when the left end of the core chamber (1) rotates downward.

3. The natural gas diffusion coefficient measurement auxiliary device of hand-operated lifting device according to claim 1, wherein:
    the hand-operated lifting device (4) is controlled by a shaking handle;
    the hand-operated lifting device (4) converts up and down reciprocating motion of the lifting mechanism of the hand-operated lifting device (4) into the rotation of the core chamber (1) by shaking the shaking handle back and forth; and the core chamber (1) loads or takes out the core under the action of gravity when rotating.

\* \* \* \* \*